United States Patent
Krischak

(10) Patent No.: US 10,451,118 B2
(45) Date of Patent: Oct. 22, 2019

(54) SEALING ARRANGEMENT FOR A LENGTH COMPENSATION OF AN ARTICULATED SHAFT, AND ARTICULATED SHAFT

(71) Applicant: SPICER GELENKWELLENBAU GMBH, Essen (DE)

(72) Inventor: Mirana Krischak, Essen (DE)

(73) Assignee: Spicer Gelenkwellenbau GmbH, Essen (DE)

( * ) Notice: Subject to any disclaimer, the term of this patent is extended or adjusted under 35 U.S.C. 154(b) by 0 days.

(21) Appl. No.: 16/066,751

(22) PCT Filed: Dec. 21, 2016

(86) PCT No.: PCT/EP2016/082153
§ 371 (c)(1),
(2) Date: Jun. 28, 2018

(87) PCT Pub. No.: WO2017/118575
PCT Pub. Date: Jul. 13, 2017

(65) Prior Publication Data
US 2019/0024726 A1    Jan. 24, 2019

(30) Foreign Application Priority Data
Jan. 8, 2016 (EP) .................................... 16150692

(51) Int. Cl.
*F16D 3/84* (2006.01)
*F16C 3/03* (2006.01)
(Continued)

(52) U.S. Cl.
CPC ............. *F16D 3/848* (2013.01); *F16C 3/03* (2013.01); *F16D 3/06* (2013.01); *F16D 3/84* (2013.01); *F16J 15/3264* (2013.01)

(58) Field of Classification Search
CPC ... F16D 3/848; F16D 3/06; F16D 3/84; F16D 3/845; F16D 3/10; F16D 3/12; F16D 3/841; F16C 3/03; F16C 3/12; F16J 15/3264
(Continued)

(56) References Cited

U.S. PATENT DOCUMENTS 1,496,236 A * 6/1924 Laughlin ................. B60B 35/12
464/16
3,123,990 A * 3/1964 Freeman ................. F16C 29/08
464/113
(Continued)

FOREIGN PATENT DOCUMENTS

CN    1807913 A       7/2006
CN    100342148 C     10/2007
(Continued)

OTHER PUBLICATIONS

European Patent Office, The International Search Report with Written Opinion issued in PCT/EP2016/082153, dated Jun. 20, 2017; 20 pages, European Patent Office, Rijswijk, Netherlands.
(Continued)

*Primary Examiner* — Nathan Cumar
(74) *Attorney, Agent, or Firm* — Marshall & Melhorn, LLC

(57) ABSTRACT

Sealing arrangement for length compensation of an articulated shaft, where the sealing arrangement has a first shaft element which has a seat section, and a sealing sleeve with a fastening section. A circumferential groove is arranged on the seat section for fixing the sealing sleeve on the first shaft element. The sealing sleeve engages into the circumferential groove. The sealing sleeve, by way of the fastening section, is axially pushed onto the seat section in the direction of a longitudinal axis. The fastening section has at least one latching projection which projects radially inward and which
(Continued)

engages in a latching manner into the circumferential groove when the sealing sleeve is in the fully pushed-on state. The seat section has a circumferential sealing face against which the fastening section of the sealing sleeve bears in an elastically tensioned manner in the fully pushed-on state.

17 Claims, 2 Drawing Sheets

(51) Int. Cl.
*F16D 3/06* (2006.01)
*F16J 15/3264* (2016.01)

(58) Field of Classification Search
USPC .......................................................... 277/571
See application file for complete search history.

(56) References Cited

U.S. PATENT DOCUMENTS

| | | | |
|---|---|---|---|
| 3,633,383 A * | 1/1972 | Kleinschmidt | F16D 3/84 |
| | | | 464/14 |
| 2005/0192106 A1 | 9/2005 | Cermak | |
| 2018/0283442 A1 * | 10/2018 | Brzezinski | F16C 3/03 |

FOREIGN PATENT DOCUMENTS

| CN | 100582512 C | 1/2010 |
|---|---|---|
| DE | 962842 C | 4/1957 |
| DE | 1910284 A1 | 9/1970 |
| EP | 1500835 A1 | 4/2004 |
| EP | 1500836 A1 | 1/2005 |
| EP | 1460296 B1 | 8/2005 |

OTHER PUBLICATIONS

China Natiional Intellectual Property Administration, Chinese Office Action issued in Application No. 201680077931.9, dated Dec. 14, 2018, 11 pages.

* cited by examiner

SEALING ARRANGEMENT FOR A LENGTH COMPENSATION OF AN ARTICULATED SHAFT, AND ARTICULATED SHAFT

The disclosure relates to a sealing arrangement for a length compensation of an articulated shaft as well as an articulated shaft with such a sealing arrangement. The sealing arrangement has a first shaft element, having a seat portion. Furthermore, the sealing arrangement has a sealing sleeve with a fastening portion, wherein for fixing the sealing sleeve on the first shaft element a circumferential groove is arranged on the seat portion, in which the sealing sleeve engages, and wherein the sealing sleeve is pushed axially in direction of a longitudinal axis with the fastening portion onto the seat portion. At least one locking projection is arranged on the fastening portion projecting radially inwards and in the completely pushed-on condition of the sealing sleeve, engages in a locking manner in the circumferential groove.

Such a sealing arrangement is known from DE 962 842 C1. The sealing sleeve shown there has a fastening portion, formed by a rubber-elastic ring, which is connected to a metal tube of the sealing sleeve. For this the tube has a fastening flange bent inwards on which the rubber-elastic ring is fastened. The rubber-elastic ring rests and is held elastically in the circumferential groove of the first shaft element.

EP 1 500 836 A1 shows another sealing arrangement. The disclosed articulated shaft comprises a first shaft element and a second shaft element, which are non-rotationally connected to each other and are guided displaceably relative to each other along a longitudinal axis. The sealing sleeve is formed as a cylindrical tube and made from a plastics with shape memory. The sealing sleeve is accommodated on a cylindrical seat face of the seat portion. The seat face is provided with at least one circumferential groove or has a radially projecting element or an increased surface roughness. After pushing the sealing sleeve onto the seat face, wherein in this condition the sealing sleeve has a radial play to the seat face, the sealing sleeve is subjected in the area of the seat face to a heat treatment, so that the sealing sleeve contracts and is clamped on the seat face and enters the at least one circumferential groove. Thus, a secure axial fastening and a securement against rotation relative to the first shaft element is achieved. Disadvantageous is however the additional cumbersome method step of heating the sealing sleeve.

In DE 1 910 284 A1 a universal joint shaft is described, which comprises a first shaft element with a first joint yoke and a second shaft element with a second joint yoke. The first shaft element has an outer toothing with outer teeth extending along a longitudinal axis. The first shaft element is accommodated axially displaceably in a connection tube of the second shaft element, which is provided corresponding to the outer toothing of the first shaft element with an inner toothing. On a cylindrical seat face of the joint yoke of the first shaft element a sealing sleeve is fastened with a first end. The sealing sleeve is made from metal and is welded to the first shaft element. The sealing sleeve is arranged coaxially to the first shaft element and carries on a second end a sealing carrier, which is pushed with a holding portion into the sealing sleeve from its second end and is continuously welded thereto. Of disadvantage is, that the sealing sleeve has to be welded in a separate method step to the first shaft element.

A similar sealing arrangement for a universal joint shaft is shown in EP 1 460 296 B1. The sealing sleeve is also made from metal and is connected to the first shaft element.

U.S. Pat. No. 1,496,236 A describes a length compensation in general and particularly a length compensation for a universal joint shaft with a tubular first shaft element and a second shaft element, which is accommodated in the first element. The second shaft element is non-rotationally accommodated in the first shaft element via a toothing and can carry out an axial displacement along a longitudinal axis relative to the first shaft element. The second shaft element forms a circular cylindrical seat face for the fastening end of a sealing sleeve made from metal. The second shaft element has a circumferential face following to the seat face, in which circumferential face a fastening portion of the sealing sleeve is radially pressed in by means of roll forming. Thus the sealing sleeve is axially retained on the second shaft element. At its free end, the sealing sleeve has a collar directed inwards. Furthermore, it has a thread, onto which a further sleeve is screwed, which accommodates a seal. This seal serves for sealing relative to the outer face of the tubular first shaft element. Also here for fastening the sealing sleeve on the shaft element a further method step, namely the roll forming, is necessary.

The present disclosure is based on the object, of providing a sealing arrangement for a length compensation of an articulated shaft, wherein the sealing sleeve can be fastened in a simple manner on a corresponding shaft element.

The object is met by a sealing arrangement for a length compensation of an articulated shaft, wherein the sealing arrangement has the following: a first shaft element having a seat portion, a sealing sleeve with a fastening portion, wherein for fixing the sealing sleeve on the first shaft element a circumferential groove is arranged on the seat portion, in which the sealing sleeve engages, wherein the sealing sleeve is axially pushed in direction of a longitudinal axis with the fastening portion onto the seat portion. At least one locking projection is arranged on the fastening portion projecting radially inwards and, in the completely pushed-on condition of the sealing sleeve, engages in a locking manner in the circumferential groove. The seat portion has a circumferentially extending sealing face, which is axially distanced from the circumferential groove. The fastening portion of the sealing sleeve abuts against the sealing face in an elastically biased manner in the completely pushed-on condition.

Furthermore, the object is met by an articulated shaft with such a sealing arrangement, wherein the articulated shaft has further a second shaft element, which is connected rotationally fast and in a displaceable manner along a longitudinal axis to the first shaft element and which has a circumferentially extending abutment face, wherein the sealing sleeve has a seal, which is arranged in sealing abutment to the abutment face.

For fastening the sealing sleeve it is thus pushed axially on the fastening portion, wherein in the completely pushed-on condition, the fastening portion serves for the fact, that the at least one locking portion engages in a locking manner in the circumferential groove of the seat portion. Thus, the sealing sleeve can be connected by simple pushing it onto the seat portion to the first shaft element.

Furthermore, a sealing face is provided on the seat portion, to which the sealing sleeve is held sealingly in abutment. The sealing face is arranged axially distanced to the circumferential groove and thus is locally separated therefrom. The sealing face is not part of the circumferential groove.

As the sealing sleeve is not welded, glued or connected in another materially manner to the first shaft element continuously in circumferential direction, no sealing effect is provided via the connection means, i.e. via the at least one locking projection and the circumferential groove. The sealing is ensured by the abutment of the fastening portion on the sealing face at the seat portion. Thus, a local separation of the two functions is provided, namely the fixing of the sealing sleeve on the first shaft element and the sealing of the sealing sleeve relative to the first shaft element.

The fastening portion is elastically deformable in radial direction, especially expandable, by means of pushing it onto the seat portion. Thus, when fastening the sealing sleeve on the seat portion, i.e. when pushing the same onto the seat portion, initially the fastening portion is deformed such, that the sealing sleeve respectively the fastening portion can be pushed onto the seat portion. When reaching the completely pushed-on position of the sealing sleeve, the at least one locking projection engages in the circumferential groove in a locking manner, wherein the fastening portion is elastically returned in direction of its original shape. Thus, no further method step is necessary to fasten the sealing sleeve on the seat portion.

When an individual circumferentially extending locking projection in the shape of a circumferentially extending collar is provided, the fastening portion is mainly expandable cylindrically.

When several individual locking projections, distributed across the circumference, are provided, which are arranged distanced in circumferential direction, the fastening portion can deform from an originally essentially cylindrical portion into a shape deviating from a cylindrical shape, wherein the circumferential portions of the fastening portion with locking projections are radially deformed further outwards than the portions of the fastening portion between two locking projections, so that a non-round shape results in cross-section.

To ensure as good as possible elastic deformation characteristics, at least the fastening portion and, if necessary however, also the whole sealing sleeve or the largest part of the sealing sleeve can be made from plastics. Obviously on this sealing sleeve further elements can be formed on, or connected materially thereto, which, if necessary, can also be made from a different material.

Preferably, the sealing face is formed conical and extends in a tapered manner in direction to the sealing sleeve. Thus, when axially pushing on, the sealing face can be pushed axially against the sealing face. When pushing on the sealing sleeve or the fastening portion of the sealing sleeve onto the sealing face, it is thus ensured, that the fastening portion is slightly radially expanded in this portion, to ensure a biasing seat of the fastening portion on the sealing face.

Preferably, the at least one locking projection is axially supported on a support face of the circumferential groove, i.e. in a direction opposite to the direction, in which one would pull the sealing sleeve off the seat portion; i.e. away from the sealing face.

To ensure a sufficient biasing of the fastening portion relative to the sealing sleeve, the fastening portion can be elastically biased axially between the support face of the circumferential groove and the sealing face of the seat portion.

Preferably, the sealing sleeve has several locking projections, which are arranged distanced from each other across the circumference.

To ensure a simple pushing on of the fastening portion of the sealing sleeve onto the seat portion, it can be provided, that between the seat portion and an inner circumferential face of the fastening portion a radial play is provided. Alternatively it can be provided, that in the completely pushed-on condition the fastening portion is brought into abutment to a seat face of the seat portion, to ensure a further seal additionally to the sealing relative to the sealing face.

The fastening portion is arranged on a first axial end of the sealing sleeve. On a second axial end of the sealing sleeve a sealing portion can be provided, which has a seal, wherein the seal serves to seal the sealing sleeve relative to a second shaft element of the articulated shaft.

In an embodiment the sealing sleeve can be formed of several parts and has a first tube end element, on which the fastening portion is formed, and a second tube end element, on which the sealing portion is formed. The second tube end element can be connected preferably materially, directly or via at least one tube intermediate element to the first tube element.

The tube end element and the optional at least one tube intermediate element can be made from plastics.

The first shaft element can have in an embodiment a shaft journal, wherein the sealing sleeve is arranged coaxially to the shaft journal with radial distance thereto. Into the radial space between the sealing sleeve and the shaft journal, the second shaft element in the shape of a sleeve or a sleeve portion of the second shaft element can enter.

The outer diameter of the shaft journal can be formed smaller than the outer diameter of the seat portion. Thus, the sealing sleeve can be pushed over the shaft journal up to reaching the seat portion without coming into contact to the shaft journal during pushing on, so that damages to the sealing sleeve or a coating on the shaft journal are prevented.

In an axial end position of the first shaft element and of the second shaft element to each other, these can be supported directly axially against each other. Thus, an end abutment is formed by the two shaft elements themselves. The sealing sleeve is not impinged or loaded.

BRIEF DESCRIPTION OF THE DRAWINGS

In the following preferred embodiments are represented and described in detail using the drawings. Herein it shows FIG. 1 a schematical side view of an articulated shaft with a length compensation with a first embodiment of a sealing arrangement according to the an embodiment of the disclosure.

DETAILED DESCRIPTION OF THE INVENTION

Figure 1:
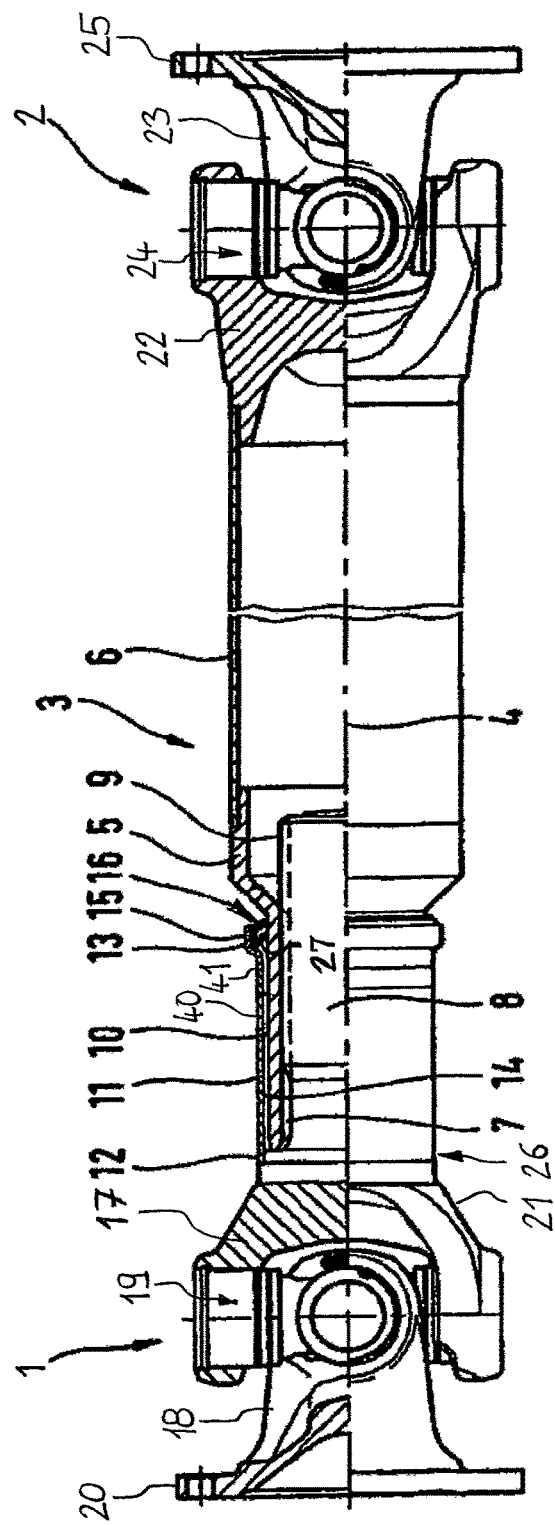

FIG. 1 shows an articulated shaft in form of a universal joint shaft having a first universal joint 1 and a second universal joint 2, which are non-rotationally connected to each other via a shaft with length compensation 3. The first universal joint 1 has a first inner yoke 17 and a first outer yoke 18, which are connected in an articulated manner to each other via a first cross assembly 19. The first outer yoke 18 has a first flange 20 for connecting a driving or driven component. The first inner yoke 17 merges in a shaft journal 8, wherein the first inner yoke 17 and the shaft journal 8 represent a first shaft element 21.

The second universal joint 2 comprises a second inner yoke 22 and a second outer yoke 23, which are connected in an articulated manner to each other via a second cross assembly 24.

The second outer yoke 23 has a second flange 25 for connecting to a driving or driven component. The second inner yoke 22 is non-rotationally connected to a connection tube 6, which again is connected non-rotationally to a second shaft element 5 in form of a sleeve.

The second shaft element 5 has a longitudinal bore, in which an inner toothing 7 is arranged, which teeth extend parallel to a longitudinal axis 4 and are arranged circumferentially distributed.

The shaft journal 8 has a complementary outer toothing 9, which teeth engage in the teeth of the inner toothing 7 and are held longitudinally displaceably relative thereto, so that between the shaft journal 8 and the second shaft element 5 a torque can be transmitted around the longitudinal axis 4.

The second shaft element 5 has an outer circular cylindrical abutment face 10. Coaxially around the shaft journal 8 and around the second shaft element 5, a sealing sleeve 11 is arranged, which is accommodated with a first axial end 12 on a seat portion 26 of the first shaft element 21. On a second axial end 13 of the sealing sleeve arranged opposite to the first axial end 12, a sealing carrier 15 with a sealing portion 16 is connected. In this case, the sealing sleeve 11 is separated in two parts, wherein a first tube end element 40 has the first axial end 12 of the sealing sleeve 11 and a second tube end element 41 has the sealing carrier 15 with the second end 13 of the sealing sleeve 11. The two tube end elements 40, 41 are directly connected to each other. The two tube end elements 40, 41 are made from plastics and are welded to each other.

The sealing sleeve 11 has an inner circumferential face 14, which is arranged with a radial distance to the abutment face 10. In the area of the sealing portion 16, a seal 27, which is fixed on the sealing portion 16 and is held in sealing abutment to the abutment face 10, rests in the radial gap between the inner circumferential face 14 of the sealing sleeve 11 and the abutment face 10 of the second shaft element 5. This sealing arrangement serves for preventing the entry of dirt or moisture into the length compensation 3 and the exiting of lubrication grease. Such universal joint shafts are used for transmitting torques, for example between an engine and a gearbox, generally in mechanical engineering or also in vehicles.

Figure 2:
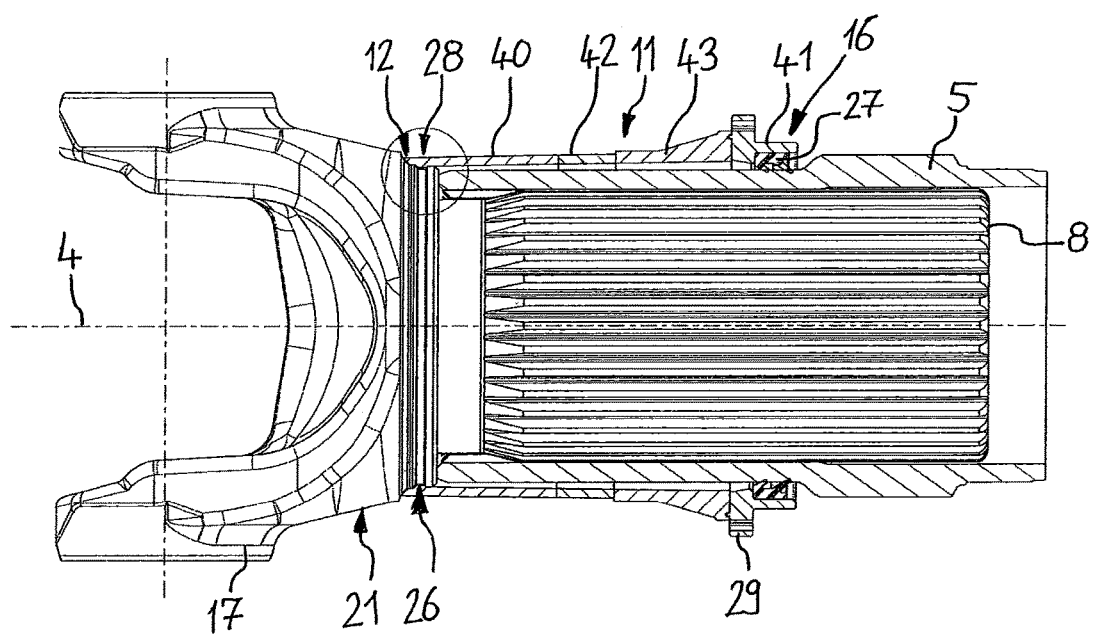
FIG. 2 a first end element with an articulated shaft and sealing sleeve in an enlarged representation of a second embodiment of a sealing arrangement, and FIG. 3 the attachment of the sealing sleeve on the first shaft element in an enlarged representation according to the detail X in FIG. 2.
Figure 3:
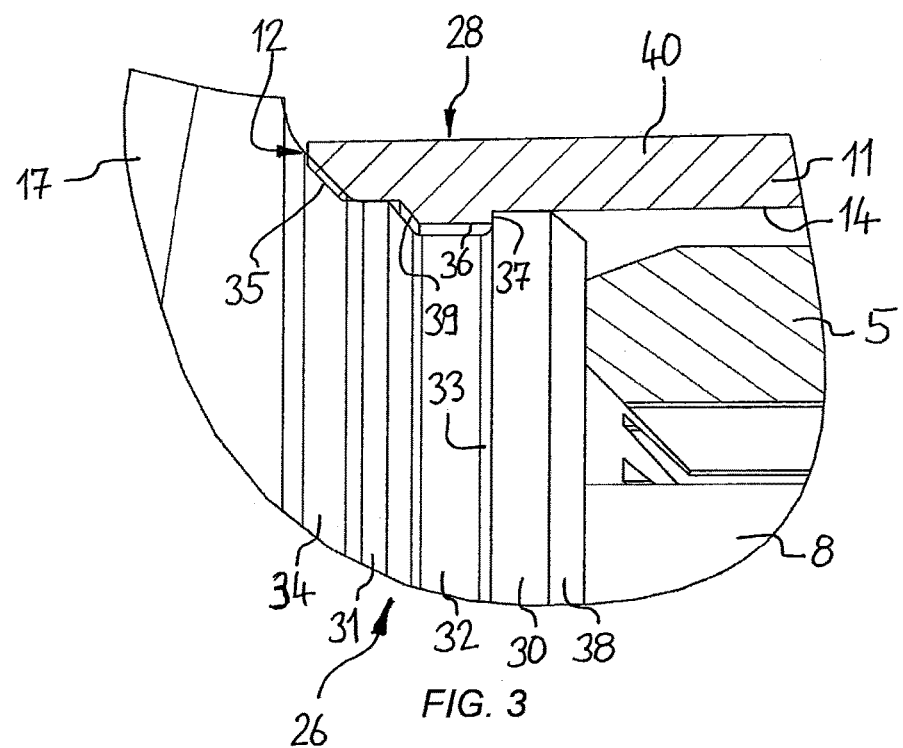

FIG. 1 serves only for the schematical overview of the individual components of the articulated shaft. FIG. 2 shows the structure of an alternative embodiment of a sealing arrangement in detail. FIG. 3 shows the detail X of FIG. 2 in an enlarged representation. FIGS. 2 and 3 are described in the following together.

The sealing arrangement according to FIGS. 2 and 3 is set-up from four parts. The sealing sleeve 11 has as in the first embodiment according to FIG. 1 a first tube end element 40, which forms the first axial end 12 of the sealing sleeve 11, and a second tube end element 41, which forms the second axial end 13 of the sealing sleeve 11. Between the two tube end elements 40, 41, two tube intermediate elements 42, 43 are arranged, which are connected to each other and to one of the tube end elements 40, 41, respectively, and form together the tubular sealing sleeve 11. The lengths of the individual tube intermediate elements 42, 43 and if necessary also of the tube end elements 40, 41 can be adapted depending on the required total length of the sealing sleeve 11.

On an end of the second tube end element 41 facing the first axial end 12 the second tube element 41 has a welding flange 29, wherein the second tube end element 40 is welded with the welding flange 29 to one of the two tube intermediate elements 43.

On a first axial end 12 the sealing sleeve 11 has the fastening portion 28, wherein the sealing sleeve 11 rests with the fastening portion 28 on the seat portion 26 of the first shaft element 21.

The seat portion 26 has a seat face with a first seat face portion 30 and a second seat face portion 31, which are formed as outer circumferential faces and which are separated from each other by a circumferential groove 32. The first seat face portion 30 is arranged closer to the shaft journal 8 then the second seat face portion 31 of the first inner yoke 17.

The circumferential groove 32 forms a support face 33 closer to the shaft journal 8 and which is facing the first inner yoke 17.

A locking projection 36 is formed on the inner circumferential face 14 of the sealing sleeve 11, as a circumferentially extending collar, wherein the locking projection 36 projects inwards in radial direction to the longitudinal axis 4 from the inner circumferential face 14. The locking projection 36 engages in the circumferential groove 32, wherein a circular ring face 37, which is arranged on a plane, arranged at a right angle to the longitudinal axis 4, is supported on the support face 33 of the circumferential groove 32 facing axially away from the first inner yoke 17. The support face 33 is also arranged on a plane, which is arranged at a right angle to the longitudinal axis 4. Thus, in the mounted condition of the sealing sleeve 17, the sealing sleeve 17 is secured axially on the fastening portion 28.

Furthermore, the fastening portion 28 has a sealing face 34, between the second seat face portion 31 and the first inner yoke 17 which sealing face 34 is formed in the shown exemplary embodiment conical and tapers in the direction towards the shaft journal 8. However, it is also possible, that the sealing face 34 has another angle to the longitudinal axis 4. Thus, the sealing face 34 can also be arranged on a plane at a right angle to the longitudinal axis 4.

The fastening portion 28 of the sealing sleeve 11 is held in axial abutment to the sealing face 34. For this, the fastening portion 28 has on the first end 12 an inner face 35, which is also formed conical in the shown exemplary embodiment and opens in the direction towards the sealing face 34. The inner face 35 can also have other angles to the longitudinal axis 3. Alternatively, instead of the inner face 35, an inner edge can be provided, which is held in sealing abutment to the sealing face 34.

In the shown example, the opening angle of the sealing face 34 and of the inner face 35 is at least approximately identical, so that these two faces are held in face to face abutment. In FIG. 3 it has to be noted, that the fastening portion 28 is illustrated non-deformed. Thus it has to be recognized, that a certain interference is present, so that the fastening portion 28 really (deviating from the simplified representation of FIG. 3) is compressed and/or radially expanded outwards. For this the fastening portion 28 is clamped between the support face 33 and the sealing face 34.

So that the fastening portion 28 has a good deformation characteristics, the wall thickness of the sealing sleeve 11 can be reduced in the area of the fastening portion 28 in relation to the residual area of the sealing sleeve 11 (not shown).

For the assembly, the sealing sleeve 11 is pushed with the fastening portion 28 onto the seat portion 26, till the locking projection 36 engages in the circumferential groove 32. For a simple pushing-on, in the transition area from the first seat face portion 30 to the shaft journal 8 a conical abutment face 38 is formed, which is represented as an outer circumferential face and tapers towards the shaft journal 8. The locking projection 36 has a corresponding conical counter face 39, which is formed as an inner circumferential face and expands in direction towards the first end 12. Thus, when pushing the sealing sleeve 11 onto the seat portion 26, the counter face 39 first abuts the abutment face 38. Because of the conical structure of the abutment face 38, the fastening portion 28 is expanded radially outwards, so that the locking projection 36 rides onto the first seat face portion 30 and can be axially pushed further, till the locking projection 36 enters the circumferential groove 32.

To ensure a simple pushing-on and also to enable a sliding-on of the sealing sleeve 11 onto the seat portion 26 as far as possible free of problems, the inner circumferential face 14 has in the area between the first end 12 and the locking projection 36 a larger inner diameter than in the area, which, when seen from the first end 12, follows the locking projection 36 in direction to the second 12. Also the outer diameter of the first seat face portion 30 is smaller than the outer diameter of the second seat face portion 31.

To ensure an as good as possible elastic deformability, the sealing sleeve 11 is made from plastics.

REFERENCE NUMERALS LIST 1 first universal joint
2 second universal joint
3 length compensation
4 longitudinal axis
5 second shaft element
6 connection tube
7 inner toothing
8 shaft journal
9 outer toothing
10 abutment face
11 sealing sleeve
12 first axial end
13 second axial end
14 inner circumferential face
15 sealing carrier
16 sealing portion
17 first inner yoke
18 first outer yoke
19 first cross set
20 first flange
21 first shaft element
22 second inner yoke
23 second outer yoke
24 second cross set
25 second flange
26 seat portion
27 seal
28 fastening portion
29 welding flange
30 first seat face portion
31 second seat face portion
32 circumferential groove
33 support face
34 sealing face
35 inner face
36 locking projection
37 circular ring face
38 abutment face
39 counter face
40 first tube end element
41 second tube end element
42 tube intermediate element
43 tube intermediate element

The invention claimed is:

1. A sealing arrangement for a shaft assembly, wherein the sealing arrangement comprises:
a first shaft element having a seat portion,
a sealing sleeve having a fastening portion for fixing the sealing sleeve on the first shaft element within a circumferential groove disposed in the seat portion of the first shaft element,
at least one locking projection, which is arranged on the fastening portion of the sealing sleeve and projects radially inward and when in a completely pushed-on condition at least a portion of the at least one locking projection of the sealing sleeve is engaged in a locking manner with the circumferential groove in the seat portion of the first shaft element,
wherein the seat portion of the first shaft element has a second seat face portion, and
wherein the seat portion of the first shaft element has a circumferentially extending sealing face that extends at an angle relative to a longitudinal axis of the shaft assembly, wherein the second seat face portion is interposed between the circumferentially extending sealing face and the circumferential groove in the seat portion of the first shaft element, wherein the circumferentially extending sealing face of the seat portion of the first shaft element is axially offset from the circumferential groove in the first shaft element, and wherein in the completely pushed-on condition at least a portion of an inner face of the fastening portion of the sealing sleeve is deformed by the circumferentially extending sealing face in order to provide a sealing engagement between the circumferentially extending sealing face of the first shaft and the fastening portion of the sealing sleeve.

2. The sealing arrangement according to claim 1, wherein the fastening portion is elastically deformable or expandable in a radial direction, and wherein in the completely pushed-on state at least a portion of the at least one locking projection are disposed within at least a portion of the circumferential groove in the seat portion of the first shaft element.

3. The sealing arrangement according to claim 1, wherein at least the fastening portion of the sealing sleeve is made from a plastic material.

4. The sealing arrangement according to claim 1, wherein the circumferentially extending sealing face of the of the seat portion of the first shaft element extends in a tapered manner inward toward the circumferential groove in the seat portion of the first shaft element.

5. The sealing arrangement according to claim 1, wherein the at least one locking projections are in direct contact with at least a portion of a support face of the circumferential groove in the seat portion of the first shaft element providing a locking engagement between the at least one locking projections and the circumferential groove.

6. The sealing arrangement according to claim 5, wherein the fastening portion of the sealing sleeve is elastically clamped axially between the support face of the circumferential groove and the circumferentially extending sealing face of the seat portion.

7. The sealing arrangement according to claim 1, wherein the sealing sleeve has a plurality of locking projections arranged on the fastening portion of the sealing sleeve.

8. The sealing arrangement according to claim 1, wherein an amount of radial play or gap is provided between the seat portion of the first shaft element and an inner circumferential face of the fastening portion of the sealing sleeve when in the completely pushed-on condition.

9. The sealing arrangement according to claim 1, wherein the fastening portion is arranged on a first axial end of the sealing sleeve.

10. The sealing arrangement according to claim 9, wherein on a second axial end of the sealing sleeve a sealing portion with a seal is arranged, wherein the seal provides a sealing engagement between the sealing sleeve and a second shaft element.

11. The sealing arrangement according to claim 10, wherein the sealing sleeve has a first tube end element, on which the fastening portion is formed, and a second tube end element, on which the sealing portion is formed.

12. The sealing arrangement according to claim 11, further comprising at least one intermediate element, wherein the at least one intermediate elements are interposed between the first tube end element and the second tube end element of the sealing sleeve.

13. The sealing arrangement according to claim 12, wherein the tube end elements and/or the at least one tube intermediate element are made from a plastic material.

14. The sealing arrangement according to claim 1, wherein the first shaft element has a shaft journal, wherein the sealing sleeve is arranged coaxially with the shaft journal, and wherein at least a portion of the sealing sleeve is disposed radially outward from the shaft journal of the first shaft element.

15. The sealing arrangement according to claim 14, wherein the outer diameter of the shaft journal of the first shaft element is smaller than the outer diameter of the seat portion of the first shaft element.

16. The sealing arrangement according to claim 1, further comprising a second shaft element, wherein the second shaft element is drivingly connected to and displaceable along a longitudinal axis relative to the first shaft element, and wherein the sealing sleeve has a seal that is sealingly engaged with at least a portion of the second shaft element and at least a portion of the sealing sleeve.

17. The sealing arrangement according to claim 16, wherein the first shaft element and the second shaft element are supported in an axial end position to each other directly axially on each other.

\* \* \* \* \*